Aug. 11, 1936.　　　L. J. SIGL　　　2,050,862
RECEPTACLE
Filed March 19, 1935
Fig. 3.
Fig. 1.
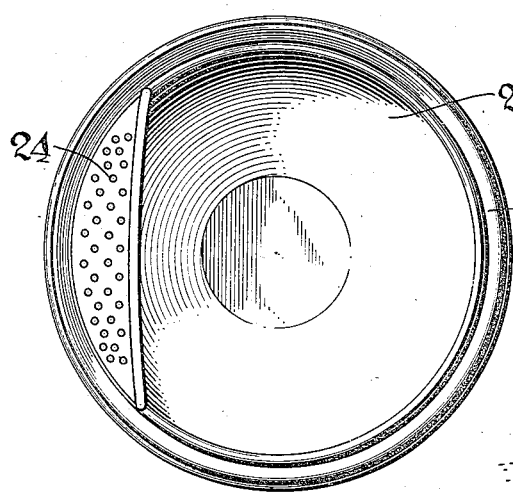
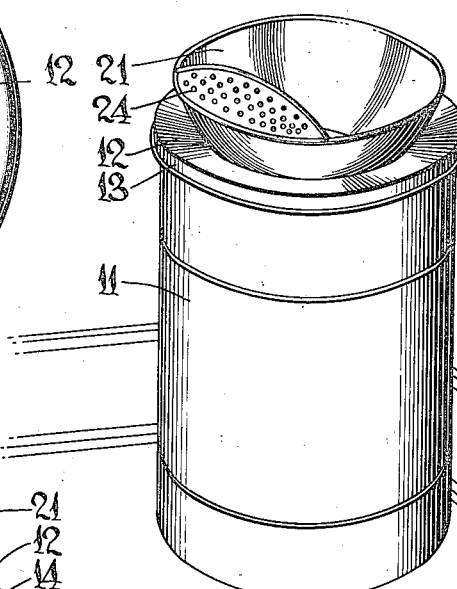
Fig. 2.
Fig. 4.
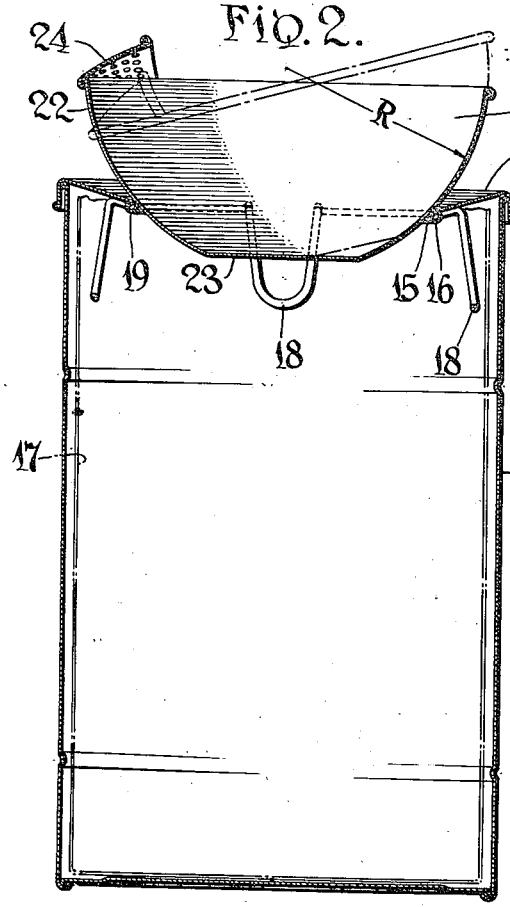
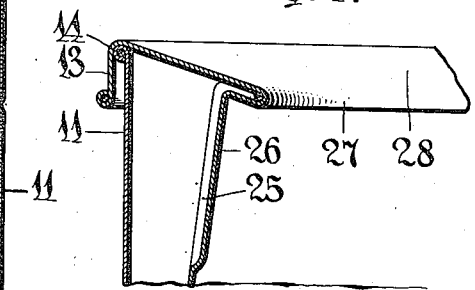
Fig. 5.
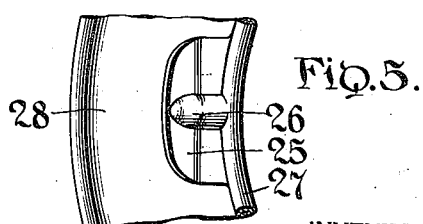
INVENTOR
Louis J. Sigl,
BY
Beau, Brooks, Buckley + Beau
ATTORNEYS Patented Aug. 11, 1936

2,050,862

UNITED STATES PATENT OFFICE 2,050,862

RECEPTACLE

Louis J. Sigl, Buffalo, N. Y.

Application March 19, 1935, Serial No. 11,848

5 Claims. (Cl. 220—24)

This invention relates to receptacles capable of various uses, and especially adapted for use as a refuse or garbage container.

The invention contemplates an open top container provided with a concaved, rim-like closure having a large central aperture normally closed by a pan, portions of which are of spherical contour, so that a relatively tight seal for the aperture is provided regardless of the relative angularity between the closure and pan. The lid is adapted to retain or align a lining member in the container proper in such manner that refuse entered through the central aperture will enter the lining. When the device is used as a kitchen refuse container, or the like, the pan may be used for conveying refuse to the container proper, in addition to its normal use as a closure for the lid aperture, and is provided with a perforated portion to facilitate draining of excess liquid from the refuse before the latter is entered in the container.

These and other objects and advantages will become apparent from the following description, made in accordance with the accompanying drawing, wherein:—

Fig. 1 is a perspective view of the device;

Fig. 2 is a vertical sectional view;

Fig. 3 is a plan view; and,

Figs. 4 and 5 are fragmentary vertical sectional and bottom plan views, respectively, of a modified lid structure.

As shown in Figs. 1 to 3, the metallic, open top container 11 has a removable lid 12 with a peripheral flange 13 engaged over the beaded open end 14 of the container. The upper surface of the lid is concaved and has a large central aperture 15 defined by a downturned flange 16. The container 11 may be provided with a removable liner 17 of metal, paper or other material, and, when paper or other flexible material is used, the open end of the liner may be held open by projections depending from the lid. As shown in Fig. 2 these projections comprise loops 18 formed from a heavy metal wire joined to lid 12 by bending portions of flange 16 around the wire, as indicated at 19.

Normally closing the aperture 15 in lid 12 is a pan 21, the side wall portion 22 of which is a substantially spherical surface of constant radius R, although the bottom wall 23 is preferably flat. An upper portion of pan 21, such as lip 24, is perforated to enable liquid to be drained from the pan without discharging solid material contained therein.

When the device is used as a waste or garbage container, as for example in a kitchen, refuse material may be moved from plates or cooking utensils into the pan 21, which, for this purpose, may be removed temporarily from the device. In this respect the pan 21 may serve in the place of the conventional sink strainer, and its flat bottom 23 permits it to repose temporarily on a sink or table while refuse is being entered into it. Excess liquid may be removed from the pan by tilting it to allow drainage through the perforations of lip 24. The refuse may then be emptied from pan 21 into the container 11, or into lining 17, through opening 15 of lid 12, and the pan then positioned to close the opening. No particular care need be taken in positioning of the pan since because of the spherical surface 22 the opening 15 will be tightly closed regardless of its angularity relative to lid 12. For example, the opening 15 is sealed by the pan when it is in either the full line or the broken line position shown in Fig. 2. Further, should the pan be accidentally displaced, the inclined or concaved surface of the lid 12 will cause the pan to automatically reassume a sealing position. A further advantage of the inclined or concaved surface of the lid is that it serves to direct waste material into the opening 15, particularly when the lid is being wiped. By the disposition of the draining, perforated portion 24 of the pan above the portion which is normally engageable with the wall of aperture 15, the capacity of the device as a drainer does not interfere with its utility as a closure for the lid aperture.

When it is desired to empty the container, the liner 17, which may be a conventional paper bag, is readily removed for disposal after lid 12 is lifted. A new liner may then be inserted, and, when lid 12 is replaced, the upper edges of the liner may be held against collapse by positioning them between the projections 18 and the upper side wall of the container.

The projections, of course, may be formed in other ways. For example, as shown in Figs. 4 and 5, projections, like 25, reinforced by rib-like deformations 26, extend from the flange 27 which defines the central aperture in the lid 28, being formed from the metal displaced in providing the aperture.

If desired, the projections 18, or 25, may be eliminated and the edges of the flexible liner return bent or folded over the beaded edge 14 of the container, where it is tightly held upon placement of the lid 12, or 28.

Other uses than as a waste receptacle readily suggest themselves. For example, the device may be used as a dispensing vessel, particularly in instances where it is desirable to have a small quantity of the contained material readily available and the remainder of the contents closed from the air. In such cases the bulk of the contents may be contained in the container proper, 11, and the smaller portion, to be more immediately dispensed, retained temporarily in the pan 21.

It will be understood that the devices herein described and shown are merely illustrative of the principles involved which may be embodied in other physical forms without departing from the scope and spirit of my invention.

I claim:

1. In a container, an open top receptacle, a removable lid for said receptacle having a relatively large aperture for passing material into the receptacle, and means depending from the under side of said lid and disposed outwardly from the walls of said aperture and spaced from the adjacent side wall portions of the receptacle for maintaining a flexible receptacle liner in alignment with said aperture, and a flexible receptacle liner having its upper edge portions disposed between the depending means and said side wall portions of the receptacle.

2. In a container, an open top receptacle, a removable lid for said receptacle having a relatively large aperture for passing material into the receptacle, and means depending from the under side of said lid and spaced from the adjacent side wall portions of the receptacle for maintaining a flexible receptacle liner in alignment with said aperture, and a flexible receptacle liner having its upper edge portions disposed between the depending means and said side wall portions of the receptacle.

3. In a container, a receptacle having bottom and side walls and an open top, a lid for said receptacle having a peripheral flange overlying the upper edge of the receptacle, said lid being removable to facilitate emptying the contents of the receptacle and having a substantially central aperture for admitting materials into the receptacle, the lid sloping downwardly from the rim thereof to the edge of the aperture, and a removable pan having a side wall portion of substantially spherical contour seated upon the lid, the spherical portion engaging the wall of the aperture and constituting a removable closure therefor, the downwardly sloping of the lid guiding the pan to seated position when the pan is placed upon the lid.

4. In a container, a receptacle having side wall portions defining the rim of an open top, a lid for said receptacle seated upon said rim of the receptacle and removable therefrom to facilitate emptying of the contents of the receptacle, said lid having a substantially circular aperture smaller than the open top of the receptacle for passing materials into the receptacle, and a removable pan having a side wall portion of substantially spherical contour seated upon the lid, the substantially spherical portion seating upon the wall of the substantially circular aperture and constituting a removable closure therefor and also constituting a vessel for conveying and temporarily containing material to be deposited through said aperture into the receptacle.

5. In combination, a container having an upper wall portion with a substantially circular aperture for passing materials into the container, and a pan having a sealing side wall portion of substantially spherical contour seating upon the edge of the aperture, whereby the pan will effectively seal the aperture in any angular position wherein the sealing portion of the pan is in engagement with said edge, and a portion of said pan above the sealing portion being perforated, whereby materials in the pan may be strained of excess liquid before being entered into said container and whereby the perforations will not interfere with sealing closure of the aperture when the pan is seated thereover.

LOUIS J. SIGL.